Patented Jan. 15, 1946

2,393,160

UNITED STATES PATENT OFFICE 2,393,160

SEPARATION OF ORES BY THE SINK AND FLOAT PROCESS

Oscar E. Harder and Arnold E. Pavlish, Columbus, Ohio, assignors, by mesne assignments, to Pittsburgh Crushed Steel Company, Pittsburgh, Pa., a corporation of Pennsylvania No Drawing. Application July 5, 1943,
Serial No. 493,570

10 Claims. (Cl. 209—173)

This invention relates to media suitable for the separation of mineral and ore particles of differing specific gravities. The invention also relates to the separation of mineral and ore particles of different specific gravity by the use of the new media.

The so-called heavy media separation processes have achieved a wide use in ore dressing. In these processes a medium is prepared by suspending finely divided solids of high specific gravity in water to produce a suspension which is self-sustaining with moderate agitation obtainable by recirculation of a portion of the medium and which has a specific gravity sufficiently high so that a portion of the constituents of the ore to be beneficiated will float and another portion will sink.

In the prior art many heavy solids have been used, such as barytes, galena, etc. These solids, while giving media that are technically useful, are open to a number of disadvantages. In the first place it is necessary to maintain the size of the finely divided solids within certain ranges in order to obtain media which have satisfactory viscosities and self-sustaining properties. However, in the operation a certain amount of abrasion takes place and with soft materials such as galena this results in the production of slimes which alter the viscosity characteristics of the medium and may result in considerable loss as it is, of course, necessary to remove from time to time the material which has become too fine. Another serious difficulty with typical solids such as galena and barytes is that there is a considerable problem in separating the finely divided medium solids which adhere to ore particles which float or sink. This has been effected in the case of galena by a froth flotation operation, but there is entailed considerable expense and in some cases substantial loss of medium solids.

A great improvement in heavy media is described in the patent to Wade, Reissue No. 22,191. Wade used finely divided magnetizable solids such as magnetite, crushed iron, and particularly ferrosilicon. These substances showed a much higher abrasion resistance than galena and particularly permitted an extremely simple separation of adherent medium solids from sink and float product. This separation was effected in magnetic separators, followed by demagnetization of the medium solids removed before reuse. The improved heavy media process of the Wade patent has achieved extraordinary commercial success, and is the most commonly used heavy media process at the present time. The use of magnetizable solids to produce a heavy medium in turn raises some subsidiary problems. The most common types of magnetizable solids are magnetite, various iron carbon alloys such as crushed cast iron, crushed steel and the like, and ferrosilicon. Magnetite is ideal for some purposes. It is abrasion resistant, it is not subject to rusting, and particularly the medium can be stored without caking. However, magnetite has a very serious limitation in that the specific gravity is not high enough to produce heavy media of sufficiently high gravity for use in the treatment of many ores without going to viscosities so high that no practical separation can be carried out. Ferrosilicon shares with magnetite a high degree of abrasion resistance, it shows adequate resistance to rusting and caking in most operations, but it suffers from the serious drawback that its cost is high. In spite of this drawback ferrosilicon has been used in many of the largest commercial heavy media operations, but the high price is a deterrent to the use of ferrosilicon in operations where cost must be kept extremely low and the use of ferrosilicon in further fields is, therefore, restricted.

Finely divided iron carbon alloys free from large proportions of other alloying substances present many advantages. Ordinary crushed cast iron or steels are very cheap, they are hard and present no abrasion problem, they are of high specific gravity, and they have high magnetic permeability which facilitates magnetic cleaning. In other words, they have many of the desirable characteristics of ferrosilicon. However, these alloys are attacked by water and oxygen, particularly because of the enormous surface presented by the finely divided medium particles. This attack of water and oxygen produces two serious results. The first, and from some points of view less serious, is the tendency to rust and lose medium in the form of oxide. The second, and in many cases most serious undesirable result, is the tendency to form hard cakes. This interferes with heavy media operations in two important respects. First, there is danger of caking on portions of the separating equipment such as cones, stirrers and the like. These cakes may be so hard and thick that the equipment has to be shut down and considerable time and labor expended to remove the hard cake. Another serious difficulty arises when medium has to be stored. This often occurs in practice because frequently a heavy media operation has to be shut down for a short time, for example over a week-end or overnight, and when this is done the formation of hard cakes makes it very difficult, and in many cases not commercially feasible, to redisperse the medium solids and the caked medium has to be thrown away. Even more serious cake formation will result when medium has to be stored for a long time as occurs in many operations in the northern part of the United States where plants have to be shut down through the severe winter season. The serious troubles described above have hitherto precluded the practical commercial use of ordinary iron carbon alloys in heavy media separation processes.

The present invention is directed to the production of suspensions of finely divided iron carbon alloys in water suitable for use in heavy media separation processes which show little tendency to rust and which are practically free from caking difficulties. It is thus possible to utilize suspensions of the present invention as media in heavy media separation processes for long periods of time and store them for shorter or longer periods without encountering the difficulties which have prevented the use of these iron alloys in the past.

According to the present invention the suspensions are made in water which is non-acidic in the presence of chromates. The chromates perform two functions. They prevent or inhibit rusting and they also prevent caking, that is to say the formation of hard adherent cakes. On the contrary, settled medium solids from media prepared according to the present invention, even on drying, form products which powder readily on touching and which even after long storage disperse with substantially the same ease as fresh medium solids.

It is an advantage that the present invention is not at all critical with respect to the chromate to be used. Excellent results are obtainable with sodium chromate, but it is possible to use also potassium chromate, calcium chromate, or dichromates such as sodium or potassium dichromate. A preferred chromate is the unpurified material obtainable by treating sodium dichromate with caustic soda or soda ash, which forms an impure non-acidic chromate which is very cheap and gives excellent results.

It is a further advantage of the present invention that the amount of chromate to be added is not critical. In general good results are obtainable with sodium chromate in amounts greater than 0.05%. It is preferable in most practical operations to use slightly more, for example 0.1%, to be sure there is sufficient chromate present, as the anti-caking results fall off very rapidly when less than 0.05% is used. It seems possible that the anti-caking effect may not be effected by the same mechanism as rusting inhibiting because amounts of chromate below 0.05% show marked rust inhibiting effects, but show little or in many cases no improvement in caking. The mechanism of the anti-caking action of the chromates has not been fully determined, and it is not desired to limit the present invention to any theory of action.

Because of the serious attack on ordinary iron carbon alloys of water which is definitely acid, it is desirable to use neutral or slightly alkaline suspensions in the present invention. This may be effected by adding any common alkali. We prefer to add soda ash or caustic soda, the former being preferable by reason of its low cost. In addition, the alkali appears to reduce the viscosity of the suspension which is of considerable practical value where media are used of gravity so high that they approximate the limit of useful viscosity. Therefore, suspensions which contain both sufficient chromate to prevent caking and some soda ash constitute the preferred embodiment of the present invention.

Throughout the specification and claims the term "iron carbon alloys" will be used to cover the common iron carbon alloys which do not contain any notable amounts of other alloying substances. They include cast iron and the common steels, and the term is intended to exclude ferrous alloys such as ferrosilicon which contain large proportions of alloying substances other than carbon.

The invention will be described in greater detail in connection with the following specific examples, which are typical embodiments thereof. The parts are by weight.

*Example 1*

A suspension in water was made of finely ground grit sold in the trade by the Pittsburgh Crushed Steel Company under the name MPDB grit. It has a specific gravity of 7.4, analyzes 92% Fe, and 76% passes through a 325 mesh screen. 50 parts of grit were suspended in 100 parts of water and divided into a number of portions to which varying amounts of soda ash and sodium chromate were added. The mixture was exposed to the air and finally dried at room temperature for several days and represents the type of oxygen exposure encountered when a heavy medium is stored for long periods of time. The results obtained are summarized in the following table:

| Reagents, per cent | | Physical characteristics |
|---|---|---|
| $Na_2CO_3$ | $Na_2CrO_4$ | |
| None | None | Very hard and adherent. |
| 0.01 | None | Hard and adherent. |
| 0.01 | 0.005 | Do. |
| 0.01 | 0.01 | Do. |
| 0.01 | 0.02 | Do. |
| 0.01 | 0.03 | Do. |
| 0.01 | 0.04 | Fairly hard and adherent. |
| 0.01 | 0.05 | Powdered readily on touching. |
| None | None | Very hard and adherent. |
| None | 0.05 | Powdered readily on touching. |
| None | 0.06 | Do. |
| None | 0.07 | Do. |

It will be apparent that chromates, either with or without soda ash, give soft cakes which powder readily on touching. Soda ash alone does not produce this result and does not appear to influence the effect of the chromate on this property. Amounts of chromate sufficient to prevent caking also inhibit rusting to a marked degree. However, much smaller amounts of chromate, namely amounts as low as 0.02%, permit very little rusting and even 0.01% has a marked inhibiting effect.

*Example 2*

A medium was prepared containing 485 parts of water and 1580 parts of the crushed iron carbon alloy described in Example 1. To this mixture was added 1.58 parts of sodium chromate and 0.32 part of soda ash. The medium had a specific gravity of 2.95 and a pH of 8.5. The medium was then used to separate a fluorite ore, sized +10 mesh —½ inch, and having an analysis as follows:

| | Percent |
|---|---|
| $CaF_2$ | 59 |
| $CaCO_3$ | 32 |
| $SiO_2$ | 7 |

A clean separation was obtained, medium particles adhering to sink and float product being recovered by magnetic cleaning in the conventional manner and reused after demagnetization. The float product contained 47.3% of the feed and the sink product 52.7%. The latter analyzed about 95% $CaF_2$ and represented, therefore, an 85% recovery. Continued operation showed no caking and the viscosity of the medium remained satisfactory.

*Example 3*

A medium was prepared by suspending 1500 parts of the iron carbon alloy described in Example 1 in 487 parts of water in which was dissolved 1.5 parts of sodium chromate. The medium had a density of 2.88 and a viscosity of 27 (Marsh funnel test 500/500).

The medium was placed in a sink and float separator apparatus and sphalerite sized +10 mesh —¼ inch was added. The ore assayed about 10% sphalerite, 25% calcite and 65% quartz. When added to the medium a sharp separation was effected, and the medium maintained its viscosity in operation with recirculation of medium adhering to sink and float product, the separation being effected by conventional magnetic separation, followed by demagnetization. The following table shows the average results obtained in the operation:

| | Wt. | Wt. | Zn | Zn dist. |
|---|---|---|---|---|
| | Parts | Per cent | Per cent | Per cent |
| Sink in 2.88 sp. gr. | 15.5 | 15.66 | 39.8 | 98.90 |
| Float in 2.88 sp. gr. | 83.5 | 84.34 | 0.08 | 1.90 |
| Feed | 99.0 | 100.00 | 6.35 | 100.00 |

In the examples given, the amount of sodium chromate generally used is given as approximately 0.1 per cent; however, greater percentages may be used if desired, but this is not economically advantageous as the results are not materially improved.

This application is a continuation-in-part of our copending application, Serial Number 336,300, filed May 20, 1940.

We claim:

1. A method of separating fragmentary mixtures of minerals of different specific gravities, which comprises subjecting the mixture to a sink and float separation in a self-sustaining medium comprising a suspension of finely divided iron carbon alloy in water, the suspension having associated therewith at least 0.05% of a chromate and the specific gravity of the suspension being greater than a portion of the minerals and less than another portion, whereby the lighter minerals float and the heavier minerals sink, and recovering separately the sink and float products.

2. A method of separating fragmentary mixtures of minerals of different specific gravities, which comprises subjecting the mixture to a sink and float separation in a self-sustaining medium comprising a suspension of finely divided iron carbon alloy in water, the suspension having associated therewith approximately 0.1% of a chromate and the specific gravity of the suspension being greater than a portion of the minerals and less than another portion, whereby the lighter minerals float and the heavier minerals sink, and recovering separately the sink and float products.

3. A method according to claim 1 in which the viscosity of the suspension is reduced by the addition of a small amount of a sodium alkali.

4. A method according to claim 2 in which the viscosity of the suspension is reduced by the addition of a small amount of a sodium alkali.

5. A method of separating fragmentary ore particles containing relatively light gangue particles and relatively heavy ore particles, which comprises subjecting the mixture to a sink and float separation in a self-sustaining medium comprising a suspension of finely divided iron carbon alloy in water, the suspension having associated therewith at least 0.05% of a chromate and the specific gravity of the suspension being greater than the light gangue particles and less than the heavy ore particles, whereby the light gangue particles float and the heavy ore particles sink, and recovering separately the sink and float products.

6. A method of separating fragmentary ore particles containing relatively light gangue particles and relatively heavy ore particles, which comprises subjecting the mixture to a sink and float separation in a self-sustaining medium comprising a suspension of finely divided iron carbon alloy in water, the suspension having associated therewith approximately 0.1% of a chromate and the specific gravity of the suspension being greater than the light gangue particles and less than the heavy ore particles, whereby the light gangue particles float and the heavy ore particles sink, and recovering separately the sink and float products.

7. A method of separating fragmentary ore particles containing relatively light gangue particles and relatively heavy ore particles, which comprises subjecting the mixture to a sink and float separation in a self-sustaining medium comprising a suspension of finely divided iron carbon alloy in water, the suspension having associated therewith at least 0.05% of sodium chromate and the specific gravity of the suspension being greater than the light gangue particles and less than the heavy ore particles, whereby the light gangue particles float and the heavy ore particles sink, and recovering separately the sink and float products.

8. A method of separating fragmentary ore particles containing relatively light gangue particles and relatively heavy ore particles, which comprises subjecting the mixture to a sink and float separation in a self-sustaining medium comprising a suspension of finely divided iron carbon alloy in water, the suspension having associated therewith approximately 0.1% of sodium chromate and the specific gravity of the suspension being greater than the light gangue particles and less than the heavy ore particles, whereby the light gangue particles float and the heavy ore particles sink, and recovering separately the sink and float products.

9. A method according to claim 7 in which there is present sufficient sodium alkali to reduce the viscosity of the suspension.

10. A method according to claim 8 in which there is present sufficient sodium alkali to reduce the viscosity of the suspension.

OSCAR E. HARDER.
ARNOLD E. PAVLISH.